United States Patent
Fukuyama

(10) Patent No.: US 11,370,179 B2
(45) Date of Patent: Jun. 28, 2022

(54) BRAIDED TEXTILE SLEEVE WITH HOT-MELT ADHESIVE YARN AND METHOD OF CONSTRUCTION THEREOF

(71) Applicant: FEDERAL-MOGUL POWERTRAIN LLC, Southfield, MI (US)

(72) Inventor: Shozo Fukuyama, Tokyo (JP)

(73) Assignee: Federal-Mogul Powertrain LLC, Southfield, MI (US)

( * ) Notice: Subject to any disclaimer, the term of this patent is extended or adjusted under 35 U.S.C. 154(b) by 771 days.

(21) Appl. No.: 16/045,521

(22) Filed: Jul. 25, 2018

(65) Prior Publication Data

US 2019/0030832 A1 Jan. 31, 2019

Related U.S. Application Data

(60) Provisional application No. 62/538,548, filed on Jul. 28, 2017.

(51) Int. Cl.
*B29C 63/18* (2006.01)
*B29C 65/00* (2006.01)
(Continued)

(52) U.S. Cl.
CPC .......... *B29C 66/4322* (2013.01); *B29C 63/18* (2013.01); *B29C 65/4815* (2013.01);
(Continued)

(58) Field of Classification Search
CPC . B29C 66/4322; B29C 65/4815; B29C 63/18; B29C 70/00; D04C 1/02; D04C 1/06
See application file for complete search history.

(56) References Cited

U.S. PATENT DOCUMENTS 4,500,590 A * 2/1985 Smith .................. D21F 1/0072
139/383 AA
2003/0199992 A1 10/2003 Schmitt
(Continued)

FOREIGN PATENT DOCUMENTS

CN 105121726 A 12/2015
CN 106660304 A 5/2017
(Continued)

OTHER PUBLICATIONS

International Search Report, dated Nov. 22, 2018 (PCT/US2018/043796).
(Continued)

*Primary Examiner* — Jeffry H Aftergut
*Assistant Examiner* — Jaeyun Lee
(74) *Attorney, Agent, or Firm* — Robert L. Stearns; Dickinson Wright PLLC

(57) ABSTRACT

A protective braided sleeve and method of construction thereof is provided. The sleeve includes a seamless, circumferentially continuous, tubular braided wall having a cavity extending lengthwise along a central longitudinal axis between opposite ends. The wall includes a plurality of yarns braided with one another, with at least one or more of the yarns including a bicomponent yarn including a core and an outer adhesive sheath adapted to be selectively melted to bond the wall to an elongate member extending through the cavity.

28 Claims, 2 Drawing Sheets

(51) Int. Cl.
  *D04C 1/02* (2006.01)
  *D04C 1/06* (2006.01)
  *B29C 70/00* (2006.01)
  *B29C 65/48* (2006.01)
  *B32B 1/08* (2006.01)

(52) U.S. Cl.
  CPC ............... *B29C 70/00* (2013.01); *D04C 1/02* (2013.01); *D04C 1/06* (2013.01); *B32B 1/08* (2013.01); *D07B 2201/209* (2013.01); *D10B 2401/041* (2013.01); *D10B 2505/12* (2013.01)

(56) References Cited

U.S. PATENT DOCUMENTS

| | | | |
|---|---|---|---|
| 2007/0166495 A1* | 7/2007 | Sellis | B32B 27/12 428/36.1 |
| 2009/0183817 A1 | 7/2009 | Sinykin | |
| 2009/0183818 A1 | 7/2009 | Sinykin | |
| 2013/0224408 A1 | 8/2013 | Malloy et al. | |
| 2014/0220276 A1 | 8/2014 | Gao et al. | |
| 2017/0030012 A1* | 2/2017 | Bathelier | B32B 5/024 |

FOREIGN PATENT DOCUMENTS

| | | |
|---|---|---|
| EP | 0656196 A1 | 6/1995 |
| WO | 9323619 A1 | 11/1993 |
| WO | 2016010730 A1 | 1/2016 |

OTHER PUBLICATIONS

Zong Yaning et al., Textile Materials Science, Donghua University Press, Jun. 30, 2013, pp. 223-226, ISBN: 9787566902900.

* cited by examiner

BRAIDED TEXTILE SLEEVE WITH HOT-MELT ADHESIVE YARN AND METHOD OF CONSTRUCTION THEREOF

CROSS-REFERENCE TO RELATED APPLICATION

This application claims the benefit of U.S. Provisional Application Ser. No. 62/538,548, filed Jul. 28, 2017, which is incorporated herein by reference in its entirety.

BACKGROUND OF THE INVENTION

1. Technical Field

This invention relates generally to textile sleeves, and more particularly to braided textile sleeves including hot-melt adhesive yarn.

2. Related Art

It is known to protect elongate members in braided textile sleeves against a variety of environmental conditions and affects and for bundling and routing purposes. Braided sleeves commonly have a wall braided as a circumferentially continuous, seamless wall, sometimes referred to as a 'closed' wall. One known advantage of a closed, braided wall construction is that the wall can be circumferentially expanded to facilitate sliding the wall over an elongated member by manually pushing and physically holding the opposite ends of the wall in a compressed fashion. By pushing the opposite ends toward one another and manually holding the wall in an axially compressed state, the braided wall is caused to take on an increased diameter and a reduced length. When in the increased diameter state, the wall can be readily disposed over the elongate member. Then, after sleeve is installed over the elongate member, the installer can release and stretch the wall, thereby taking on a circumferentially decreased diameter and increased length. Then, in order to maintain the sleeve in its "as intended" installed state, an adhesive film in the form of tape is commonly wrapped about at least a portion of the sleeve to prevent the yarns from shifting and expanding, thereby fixing the sleeve in the desired location. The tape is also typically adhered to an outer surface of the elongate member being protected by the sleeve to further fix the sleeve in its desired location. Otherwise, in lieu of tape, sometimes a secondary adhesive is applied to the sleeve and/or to an outer surface of the elongate member to fix the sleeve to the elongate member.

The aforementioned ability to fix the braided wall of the sleeve in its intended location via tape or a secondary adhesive comes with potential drawbacks. For example, the tape and adhesive must be purchased separately and inventoried, thereby adding cost to the application. Further, the tape can become damaged and/or contaminated both during application and while in use, thereby affecting its ability to maintain the sleeve in its fixed location. Further yet, the tape and adhesive can be unsightly upon application, or can otherwise become unsightly over time (e.g. damaged tape looks bad and their adhesives can become whitened with time and exposure to the environment, and further such adhesives commonly lack the required heat resistance for the intended application, thereby causing the adhesive to become embrittled over time and fail to maintain a sufficient bond for the full service life of the sleeve). Additionally, application of tape and adhesive can be labor intensive, thereby adding further cost to the application.

SUMMARY OF THE INVENTION

In accordance with one aspect of the invention, a protective braided sleeve, for protecting an elongate member contained therein, includes a seamless, circumferentially continuous, tubular braided wall having a cavity extending lengthwise along a central longitudinal axis between opposite ends. The wall includes a plurality of ends of yarn braided with one another, with at least one or more of the yarns including a bicomponent yarn including a core and an outer adhesive sheath adapted to be selectively melted to bond the wall to an elongate member extending through the cavity. The outer adhesive sheath has a thickness between about 0.3-0.8 mm to enhance the bonding force between the wall and the elongate member, with the enhanced bonding force being provided across an axially extending bond joint formed along a relatively small axial length of the wall, relative to the full axial length of the wall, while preventing unwanted separation of the wall and the elongate member from one another over their intended useful life.

In accordance with another aspect of the invention, the core can be provided as a monofilament having a diameter between about 0.20-0.30 mm, such that the outer adhesive sheath is at least as thick as the core to enhance the bond strength of the wall to the elongate member.

In accordance with another aspect of the invention, the outer sheath can be provided having a thickness at least two times greater than the diameter of the core, wherein such relative 2:1 ratio of thickness between the outer sheath and the core has been found to increase the bond strength between the wall and the elongate member compared to a ratio of 1:1.

In accordance with another aspect of the invention, the outer sheath can be provided having a thickness at least three times greater than the diameter of the core wherein such relative 3:1 ratio of thickness between the outer sheath and the core has been found to increase the bond strength between the wall and the elongate member compared to a ratio of 2:1.

In accordance with another aspect of the invention, the outer sheath can be provided having a thickness at least four times greater than the diameter of the core wherein such relative 4:1 ratio of thickness between the outer sheath and the core has been found to increase the bond strength between the wall and the elongate member compared to a ratio of 3:1, and ultimately maximize the bond strength.

In accordance with another aspect of the invention, the core can be provided as a multifilament having a denier between about 800-1250, wherein the outer sheath is able, upon being melted, diffuse between individual filaments of the multifilament to enhance the bond strength between the wall and the elongate member.

In accordance with another aspect of the invention, the plurality of ends of yarns includes the bicomponent yarn and non-bicomponent yarn in a respective ratio of about 1:4.

In accordance with another aspect of the invention, the number of ends of the bicomponent yarn relative to the number of ends of the non-bicomponent yarn is no greater than a ratio of 1:4, thereby minimizing the cost of the more expensive bicomponent yarns while providing sufficient bonding strength from the melted bicomponent yarns to bond the wall of the sleeve to the elongate member contained therein.

In accordance with another aspect of the invention, the non-bicomponent yarn can be provided as a multifilament and/or monofilament having a melt temperature greater than a melt temperature of the outer sheath.

In accordance with another aspect of the invention, the outer adhesive sheath can be formulated including a plurality of constituent ingredients having different melt temperatures from one another.

In accordance with another aspect of the invention, the core can be formed of polyethylene terephthalate.

In accordance with another aspect of the invention, a method of constructing a braided sleeve configured to protect an elongate member extending therethrough includes braiding a plurality of ends of yarn with one another to form a seamless tubular wall having a cavity extending lengthwise along a central longitudinal axis, with at least one or more of the ends of yarn including a bicomponent yarn including a core and an outer adhesive sheath adapted to be selectively melted to bond the wall to the elongate member extending through the cavity, wherein the outer adhesive sheath is provided having a thickness between about 0.3-0.8 mm to enhance the bonding force between the wall and the elongate member across an axially extending bond joint formed along a relatively small axial length of the wall, relative to the full axial length of the wall, while preventing unwanted separation of the wall and the elongate member from one another over their intended useful life.

In accordance with another aspect of the invention, the method can further include formulating the outer sheath including a plurality of constituent ingredients having different melt temperatures from one another, and having a combined melt temperature of between about 120-140 degrees Celsius, which is lower than the melt temperature of the inner core to avoid melting the inner core in final assembly.

In accordance with another aspect of the invention, the method can further include providing the core formed of polyethylene terephthalate.

In accordance with another aspect of the invention, the method can further include providing the core formed of a monofilament.

In accordance with another aspect of the invention, the method can further include providing the core formed of a multifilament, thereby allowing melted material of the outer adhesive sheath to penetrate between individual filaments of the multifilament to enhance bonding of the yarns with one another.

In accordance with another aspect of the invention, the method can further include providing the core as a monofilament having a diameter between about 0.20-0.30 mm.

In accordance with another aspect of the invention, the method can further include providing the adhesive outer sheath having a thickness equal to or greater than two times the diameter of the core, and up to four times greater than the diameter of the core wherein such relative 2:1 ratio of thickness between the outer sheath and the core has been found to increase the bond strength between the wall and the elongate member compared to a ratio of 1:1, while a relative 4:1 ratio has been found to maximize the bond strength.

In accordance with another aspect of the invention, the method can further include providing the core as a multifilament having a denier between about 800-1250.

In accordance with another aspect of the invention, the method can further include braiding the bicomponent yarns with non-bicomponent yarns in a ratio of about 1:4, respectively, thereby minimizing the content of the more expensive bicomponent yarns, while at the same time providing the strength of bonding needed to maintain the sleeve in its desired position relative to the elongate member extending therethrough.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
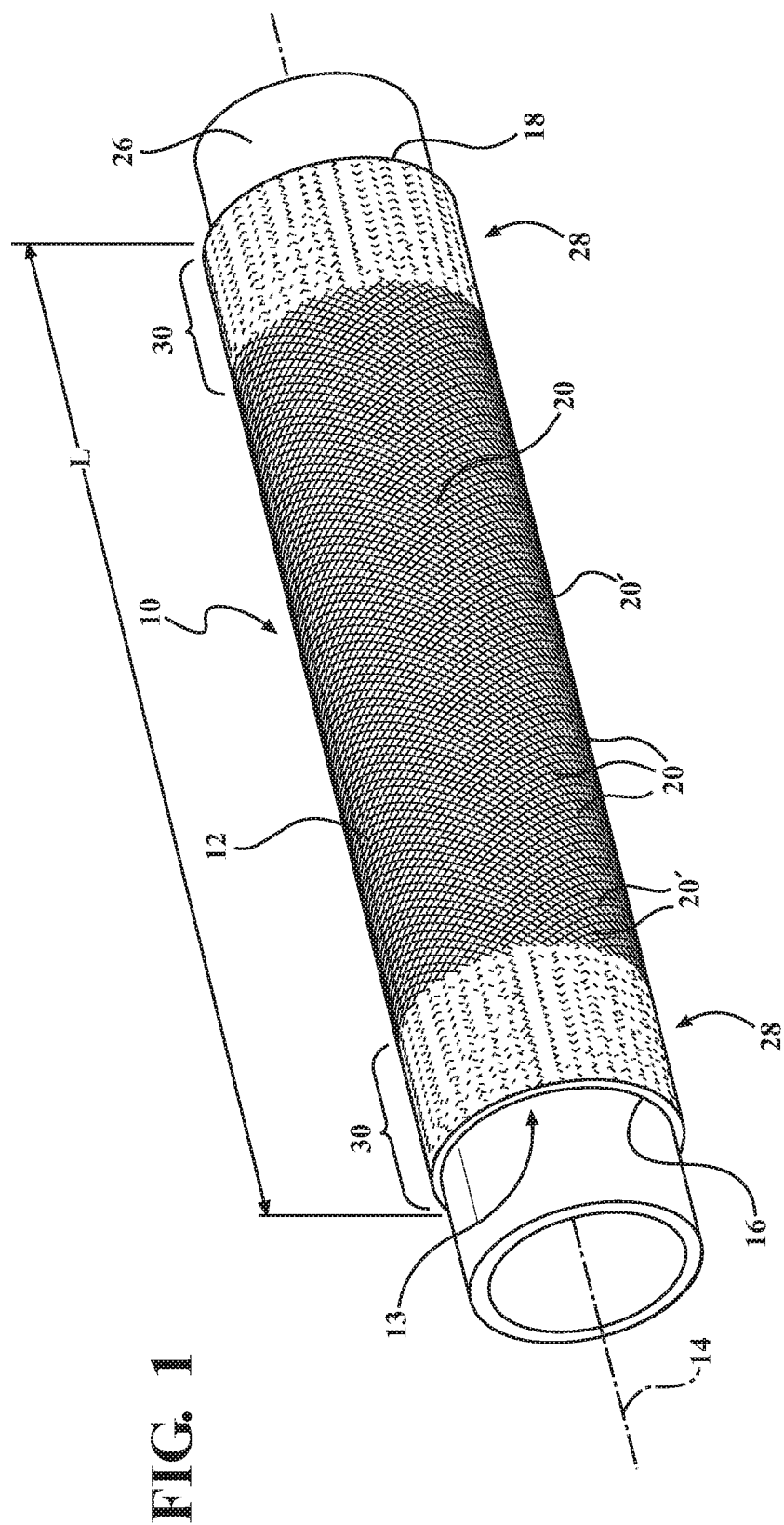
FIG. 1 is a schematic perspective view of a tubular braided sleeve constructed in accordance with one embodiment of the invention shown bonded to an elongate member extending therethrough.
Figure 2:
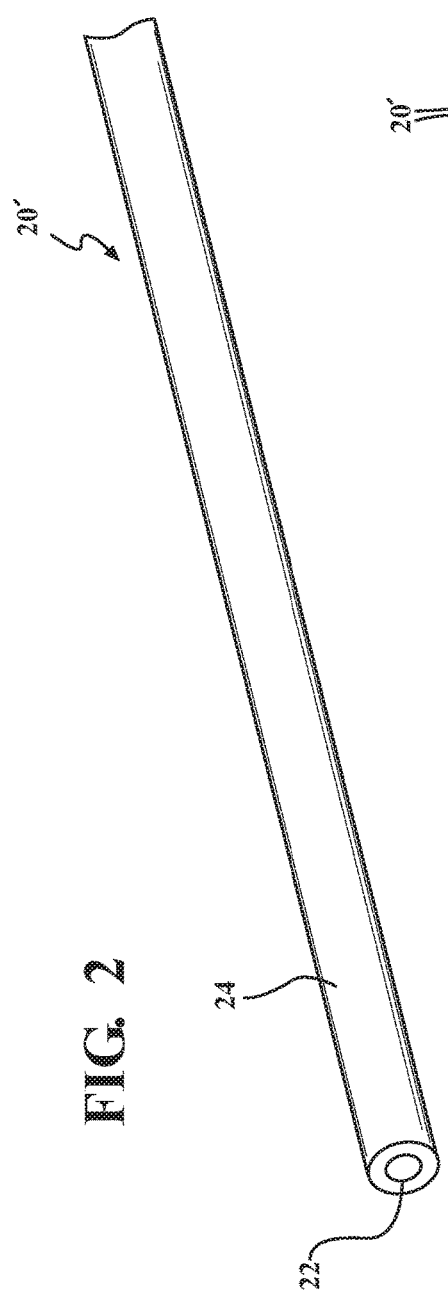
FIG. 2 is a perspective view of a bi-component yarn used in the construction of the sleeve of FIG. 1.

Referring in more detail to the drawings, FIG. 1 illustrate a braided protective textile sleeve, referred to hereafter as sleeve 10, constructed in accordance with one aspect of the invention. The sleeve 10 has a braided, circumferentially continuous, seamless tubular wall 12 having a cavity 13 extending lengthwise along a central longitudinal axis 14 between opposite ends 16, 18. The wall 12 includes a plurality of separate ends of yarn braided with one another, with at least one or more of the separate ends being provided as a bicomponent filament, referred to hereafter as bicomponent yarn 20' including a center core 22 and an outer adhesive sheath 24 surrounding the core 22, as shown in FIG. 2, wherein the sheath 24 is adapted to be selectively melted to bond the wall 12 to an elongate member 26 extending through the cavity 13, with remaining yarns other than the bicomponent yarns 20' being provided as standard non-bicomponent yarns 20.

Figure 3:
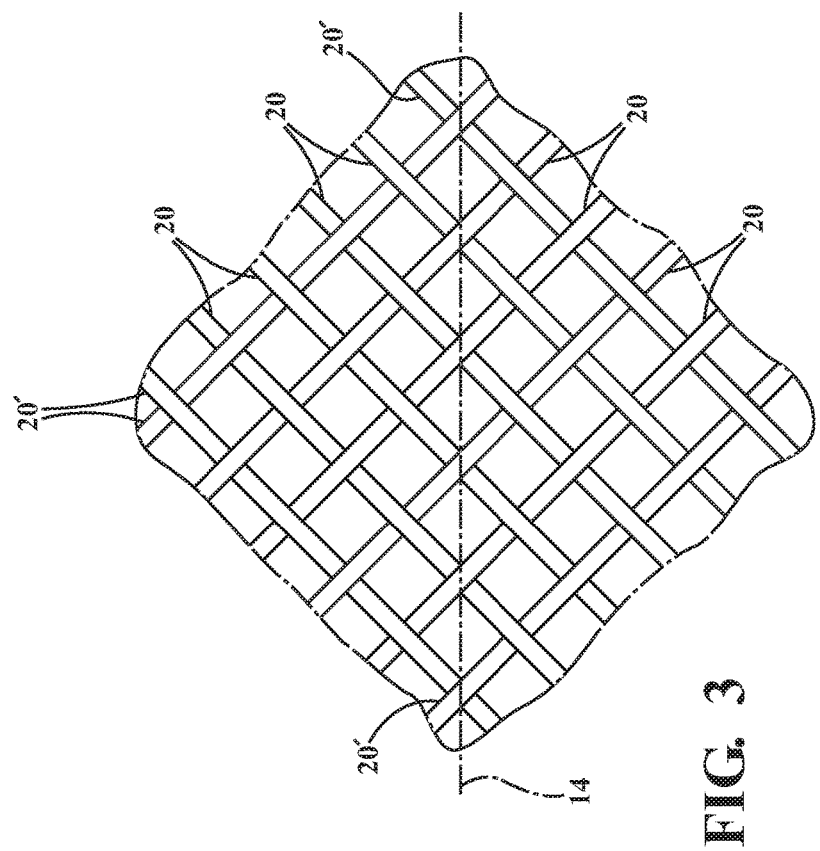
FIG. 3 illustrates an enlarged portion of a wall of a braided sleeve in accordance with one non-limiting aspect of the disclosure.

The wall 12 can include a minimal number of ends of the bicomponent yarn 20', due to the enhanced bonding strength of the bicomponent yarns 20', for reasons discussed further below, thereby reducing the cost of the sleeve 10, in that the relative piece cost of bicomponent yarn 20' is greater than that of the non-bicomponent yarn 20. It has been discovered herein that a wall 12 having a ratio of bicomponent yarn 20' to non-bicomponent yarn 20 of 1:4 (FIG. 3, showing portion of the wall 12, with the remaining portion of the wall 12 being the same as illustrated) provides a sufficient bonding force with the elongate member 26 to avoid separation therefrom. Accordingly, in a sleeve having a total of 32 ends of yarn (including both bicomponent and non-bicomponent yarns 20', 20), by way of example and without limitation, only 8 ends of bicomponent yarn 20' are needed to provide a sufficient bonding force with the elongate member 26 upon being melted, solidified and bonded therewith. It is to be recognized that the wall 12 could be constructed of a greater or less ratio, if desired, though a ratio of 1:4 has been found desired. Further yet, the area of the sleeve 10 required to be bonded to the elongate member 26 via bond joints 28 can be minimized, again due to the enhanced bonding strength of the bicomponent yarns 20', wherein the individual bond joints 28 can extend about the entirety of the circumference of the wall 12 and extend as little as about 20 mm in axial length, which is a small axial length relative to a length L of the sleeve 10, with the length L contemplated as being between about 1-5 ft or greater, depending on the application, with the bond joints 28 shown, by way of example and without limitation, as being formed adjacent the opposite ends 16, 18 of the wall 12 over end regions 30. It is to be recognized that the bond joints 28 can be formed in any desired locations along the length of the sleeve 10, and in any number, as desired for the intended application, given the presence of the braided bicomponent yarns 20' extending along the entire length of the wall 12. However, it is contemplated that a pair of bond joints 28 is sufficient to fixing the sleeve 10 to the elongate member 26, regardless of the location of the bond joints 28.

The ability to use a relative small ratio of bicomponent yarn 20' to non-bicomponent yarn 20 of 1:4 to provide a sufficient bonding force with the elongate member 26 to avoid separation therefrom is provided by the outer adhesive sheath 24 having a radial thickness between about 0.3-0.8 mm. Further yet, the outer adhesive sheath 24 can be formulated including a plurality of constituent hot melt ingredients having different melt temperatures from one another, having a composite melt temperature between about 120-140 degrees Centigrade, and the core 22 can be formed of a standard, relatively high melt temperature (relative to the lower melt temperature of the core 22) monofilament or a multifilament, such as from polyethylene terephthalate (PET), by way of example and without limitation. As such, upon melting the sheath 24 and forming the desired bond joint(s) 28, the core 22 does not melt. The core 22 is preferably provided having a diameter between about 0.20-0.30 mm if provided as a monofilament, and is preferably provided having a denier between about 800-1250 if provided as a multifilament. Accordingly, the radial thickness of the sheath 24 is equal to or greater than the preferred diameter of the core 22, including up four times the diameter of the core 22, which ultimately increases the coverage of the sheath 24 upon being melted, thereby maximizing the strength and coverage of the bond joint 28 about the entirety of the circumference, even though the number of ends of the bicomponent yarn 20' are greatly reduced relative to the number of ends of the non-bicomponent yarn 20, as discussed above.

The non-bicomponent yarns 20 can be provided a monofilaments and/or multifilaments of any desired material, such as nylon, PET, polypropylene (PP), and the like. The non-bicomponent yarns 20 can be provided to enhance abrasion resistance, impact resistance and the like at a relatively low cost.

In application, with the outer sheath 24 having an optimal adhesion thickness, as discussed above, the sleeve 10 can be adhered to the elongate member 26, such as a rubber hose or polyamide tube, by way of example and without limitation, without concern of becoming detached therefrom, thereby doing away with the need for supplemental fastening mechanisms, such as tape or clamps. Further yet, as discussed above, it has been found that the bond joints 28 may be formed over significantly less than the entirety of the length L of the hose 26, such as at opposite end regions 30 immediately adjacent the opposite ends 16, 18, by way of example and without limitation, or elsewhere, as desired, wherein the axial length of the bond joint 28 can be little as about 20 mm, with a range of generally preferred axial length of the bond joint 28 being about 20-40 mm, by way of example and without limitation, and more preferably between about 20-30 mm. Accordingly, only a relatively small axially extending region(s) of the sleeve 10 needs to be melted to form the individual bond joint(s) 28 to reliably bond the wall 12 to the elongate member 26, and thus, the axial length of the more rigid region(s) formed along and via the melted and solidified bond joint(s) 28 can be minimized, thereby enhancing the flexibility of the sleeve 10 and elongate member 26 extending between the bond joint(s) 28 as a result of the unmelted, non-bonded region of the sleeve 10 retaining greater relative flexibility and freedom of relative movement with the elongate member 26. Accordingly, in a case where the bond joints 28 are restricted to regions adjacent the opposite ends 16, 18 of the sleeve 10, the entire region of the wall 12 extending axially between the pair of bond joints 28 can remain free of bond joints, thereby retaining enhanced flexibility. Accordingly, the assembled sleeve 10 and elongate member 26 can be routed along meandering paths, as desired, due to the minimal axially extending length of the bond joints 28. Of course, the axial length of the bond joint(s) 28 can be formed having any desired length greater than 20 mm, as desired, and further, can be formed along the entirety of the sleeve 10, if desired.

In accordance with another aspect of the invention, a method of constructing a braided textile sleeve 10 includes braiding a plurality of yarns 20 with one another to form a seamless tubular wall 12 having a cavity 13 extending lengthwise along a central longitudinal axis 14, with at least one or more of the yarns including a bicomponent yarn 20' including a core 22 and an outer adhesive sheath 24 adapted to be selectively melted to bond the wall 12 to an elongate member 26 extending through the cavity 13. In accordance with a preferred, non-limiting embodiment, the bicomponent yarn 20' is provided in a ratio of about 1:4 relative to the non-bicomponent yarn 20, with the respective yarns 20', 20 being braided uniformly with one another in a symmetrical braid pattern in opposite helical S and Z directions. Upon braiding the sleeve 10, the sleeve 10 can be disposed about the elongate member 26 to be protected, and then the bond joints 28 can be formed to bond the wall 12 to the elongate member 26, such as via a suitably heated clamp tool, such as disclosed in co-owned U.S. patent application Ser. No. 15/457,729, filed Mar. 13, 2017, by way of example and without limitation, which is incorporated herein by way of reference in its entirety.

In accordance with another aspect of the invention, the method can further include providing the outer adhesive sheath 24 having a thickness between about 0.3-0.8 mm to enhance the bonding force between the wall 12 and the elongate member 13.

In accordance with another aspect of the invention, the method can further include formulating the outer sheath 24 including a plurality of constituent ingredients having different melt temperatures from one another, wherein the combined melt temperature can be provided to range between about 120-140 degrees Celsius under an applied clamp force of about 20-40N for a duration of about 8-12 seconds, by way of example and without limitation.

In accordance with another aspect of the invention, the method can further include providing the core 22 being formed of polyethylene terephthalate.

In accordance with another aspect of the invention, the method can further include braiding the bicomponent yarns 20' with non-bicomponent yarns 20 in a ratio of about 1:4, respectively.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A protective braided sleeve, comprising:
a seamless, circumferentially continuous, tubular braided wall having a cavity extending lengthwise along a central longitudinal axis between opposite ends, said wall having a plurality of ends of yarn braided with one another, with at least one or more of said yarns including a bicomponent yarn including a core and an outer sheath, said outer sheath being adapted to be selectively melted, without melting the core, to bond the wall to an elongate member extending through the cavity, wherein the outer sheath has a thickness between about 0.3-0.8 mm.

2. The protective braided sleeve of claim 1, wherein said core is a monofilament having a diameter between about 0.20-0.30 mm.

3. The protective braided sleeve of claim 2, wherein said outer sheath is at least two times thicker than the diameter of said core.

4. The protective braided sleeve of claim 3, wherein said outer sheath is at least three times thicker than the diameter of said core.

5. The protective braided sleeve of claim 4, wherein said outer sheath is at least four times thicker than the diameter of said core.

6. The protective braided sleeve of claim 1, wherein said core is a multifilament having a denier between about 800-1250.

7. The protective braided sleeve of claim 1, wherein said plurality of ends of yarns includes said bicomponent yarn and non-bicomponent yarn in a respective ratio of about 1:4.

8. The protective braided sleeve of claim 7, wherein the number of ends of said bicomponent yarn relative to the number of ends of said non-bicomponent yarn is no greater than a ratio of 1:4.

9. The protective braided sleeve of claim 7, wherein said non-bicomponent yarn is a monofilament having a melt temperature greater than a melt temperature of said outer sheath.

10. The protective braided sleeve of claim 7, wherein said non-bicomponent yarn is a multifilament having a melt temperature greater than a melt temperature of said outer sheath.

11. The protective braided sleeve of claim 1, wherein said outer sheath is melted and solidified over at least one bond joint having an axial length between about 20-40 mm.

12. The protective braided sleeve of claim 11, wherein said outer sheath is melted and solidified over at least one bond joint having an axial length between about 20-30 mm.

13. The protective braided sleeve of claim 11, wherein said at least one bond joint includes a plurality of bonds joints, with a separate one of said plurality of bond joints extending adjacent said opposite ends.

14. The protective braided sleeve of claim 13, wherein said plurality of bond joints includes only a pair of bond joints, with the entire region of said wall extending axially between said pair of bond joints remaining free of bond joints.

15. A method of constructing a protective sleeve, comprising:
braiding a seamless, circumferentially continuous, tubular wall having a cavity extending lengthwise along a central longitudinal axis between opposite ends with a plurality of ends of yarn, with at least one or more of the ends of yarn including a bicomponent yarn including a core and an outer sheath, with the outer sheath being adapted to be selectively melted, without melting the core, to bond the wall to an elongate member extending through the cavity, wherein the outer sheath has a thickness between about 0.3-0.8 mm.

16. The method of claim 15, further including providing the core as a monofilament having a diameter between about 0.20-0.30 mm.

17. The method of claim 16, further including providing the outer sheath being at least two times thicker than the diameter of the core.

18. The method of claim 17, further including providing the outer sheath being at least three times thicker than the diameter of the core.

19. The method of claim 18, further including providing the outer sheath being at least four times thicker than the diameter of the core.

20. The method of claim 15, further including providing the core as a multifilament having a denier between about 800-1250.

21. The method of claim 15, further including providing the plurality of ends of yarns including the bicomponent yarn and non-bicomponent yarn in a respective ratio of about 1:4.

22. The method of claim 21, further including providing the number of ends of the bicomponent yarn relative to the number of ends of the non-bicomponent yarn in no greater than a ratio of 1:4.

23. The method of claim 21, further including providing the non-bicomponent yarn as a monofilament having a melt temperature greater than a melt temperature of the outer sheath.

24. The method of claim 21, further including providing the non-bicomponent yarn as a multifilament having a melt temperature greater than a melt temperature of the outer sheath.

25. The method of claim 15, further including providing the wall having at least one bond joint formed of melted and solidified material of the outer sheath, with the at least one bond joint having an axial length extending between about 20-40 mm.

26. The method of claim 15, further including providing the wall having at least one bond joint formed of melted and solidified material of the outer sheath, with the at least one bond joint having an axial length extending between about 20-30 mm.

27. The method of claim 25, further including providing the wall having a plurality of the bonds joints, with a separate one of the bond joints extending adjacent the opposite ends of the sleeve.

28. The method of claim 27, further including providing the plurality of bond joints including only a pair of bond joints, and providing the entire region of the wall extending axially between the pair of bond joints remaining free of bond joints.

* * * * *